(12) United States Patent
Ball

(10) Patent No.: US 6,948,518 B1
(45) Date of Patent: Sep. 27, 2005

(54) ESCUTCHEON FOR WALL MOUNTED FAUCETS AND HYDRANTS

(75) Inventor: William T. Ball, Colorado Springs, CO (US)

(73) Assignee: WCM Industries, Inc., Colorado Springs, CO (US)

(*) Notice: Subject to any disclaimer, the term of this patent is extended or adjusted under 35 U.S.C. 154(b) by 0 days.

(21) Appl. No.: 10/974,228

(22) Filed: Oct. 27, 2004

(51) Int. Cl.[7] .................................................. F16L 5/00
(52) U.S. Cl. ...................................... 137/359; 137/360
(58) Field of Search .................................. 137/359, 360

(56) References Cited

U.S. PATENT DOCUMENTS

| 2,708,449 A | * | 5/1955 | Keithley | ...................... 137/359 |
| 6,678,903 B1 | * | 1/2004 | Rhodes | ........................... 4/695 |
| 2002/0189674 A1 | * | 12/2002 | Meeder | ....................... 137/359 |

* cited by examiner

Primary Examiner—A. Michael Chamberts

(57) ABSTRACT

A wall hydrant having an inlet tube extending through a wall having exterior and interior surface and including an escutcheon received by the inlet tube for placement against the interior surface of the wall with flexible prongs that extend radially from a center for securing the hydrant against the exterior surface of the wall.

13 Claims, 2 Drawing Sheets

ESCUTCHEON FOR WALL MOUNTED FAUCETS AND HYDRANTS

BACKGROUND OF THE INVENTION

The present invention relates to a wall hydrant and, more specifically, an escutcheon for securing a hydrant to the wall.

Wall hydrants are typically secured to a wall by screws or other hardware that secure to a plate or the like mounted on an interior side of the wall. While conventional hardware provides a sturdy connection, it often is difficult to align the hardware and typically requires the use of at least two people to install. Additionally, conventional means of connection require multiple screws, nuts, and other hardware, all of which frustrates the installation process.

Another disadvantage with conventional hardware is that it is often difficult and time consuming to remove wall hydrants. Typically, conventional means of connection require removal of screws, nuts, and the like in order to remove the wall hydrant from the wall. Accordingly, there is a need in the art for an improved escutcheon for securing a hydrant to the wall.

It is therefore a principal object of this invention to provide an improved escutcheon for securing a hydrant to the wall without the need for additional hardware.

A further object of this invention is to provide an escutcheon with flexible prongs for securing the hydrant to the wall.

Still a further object of this invention is to provide an escutcheon with a tear-away portion for quick removal of the escutcheon.

These and other objects will be apparent to those skilled in the art.

BRIEF SUMMARY OF THE INVENTION

The present invention is directed toward a wall hydrant having an inlet tube extending through a wall having exterior and interior surface. The hydrant includes an escutcheon received by the inlet tube for placement against the interior surface of the wall with flexible prongs that extend radially from a center for securing the hydrant against the exterior surface of the wall. The escutcheon further includes a tear-away portion extending outwardly from the center.

DESCRIPTION OF THE PREFERRED EMBODIMENTS OF THE INVENTION

Figure 1:
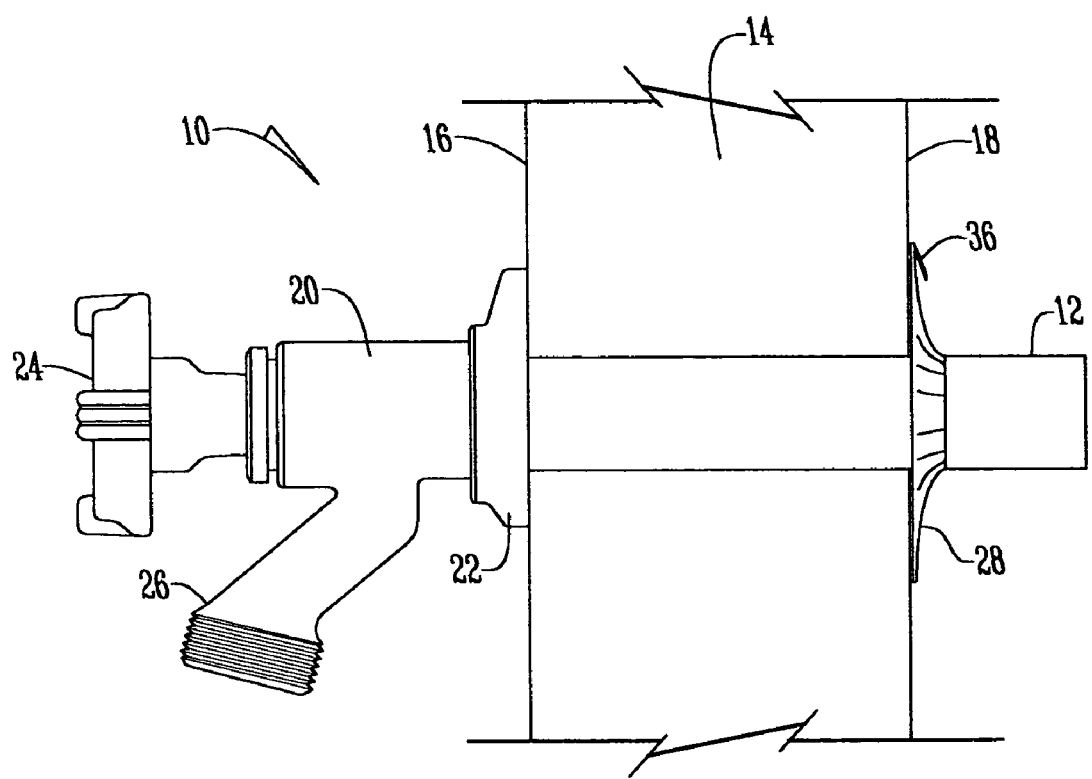
FIG. 1 is side view of the present invention as shown with a faucet.

With reference to the drawings, a wall faucet or hydrant 10 is shown with an inlet tube 12 extending through a wall 14 having an exterior surface 16 and an interior surface 18. The hydrant 10 has a head 20 with a flange 22 that secures against the exterior surface 16 of the wall 14. Additionally, the hydrant 10 has an adjusting member 24 for controlling the flow of fluid through the inlet tube 12 and out the exit conduit 26.

Figure 2:
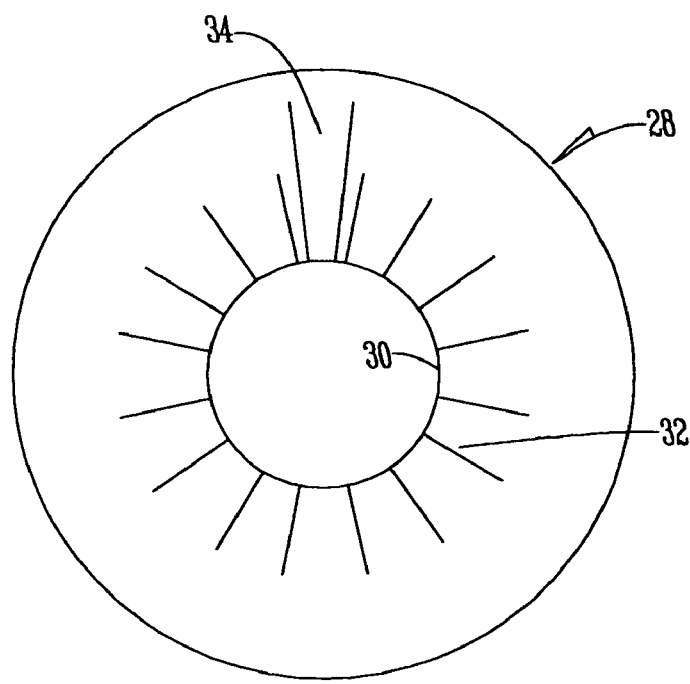
FIG. 2 is a plan view of an embodiment of the present invention.

An escutcheon 28 is provided for securing the hydrant 10 against the wall 14. Specifically, the escutcheon 28 is received by the inlet tube 12 of the hydrant 10 and is placed against the interior surface 18 of the wall 14 to secure the flange 22 against the exterior surface 16 of the wall 14;

The escutcheon 28 is generally annular-shaped with a central aperture 30, as shown in FIG. 2. Prongs 32 extend radially from the central aperture 30 and bend back when the escutcheon 28 is inserted on the inlet tube 12. In this manner, the flexible prongs 32 grasp the inlet tube 12 to secure the escutcheon 28 against the interior surface 18 of the wall 14.

A tear-away portion 34 extends outwardly from the central aperture 30 of the escutcheon 28. A tab 36 allows one to grasp and pull the tear-away portion 34 for removal of the escutcheon 28. The tear-away portion 34 may include perforations in the escutcheon 28, allowing the escutcheon 28 to tear when force is exerted on tab 26. Alternatively, tear-away portion 34 may comprise a weaker portion of the escutcheon 28, including a reduced thickness in the escutcheon material.

Figure 3:
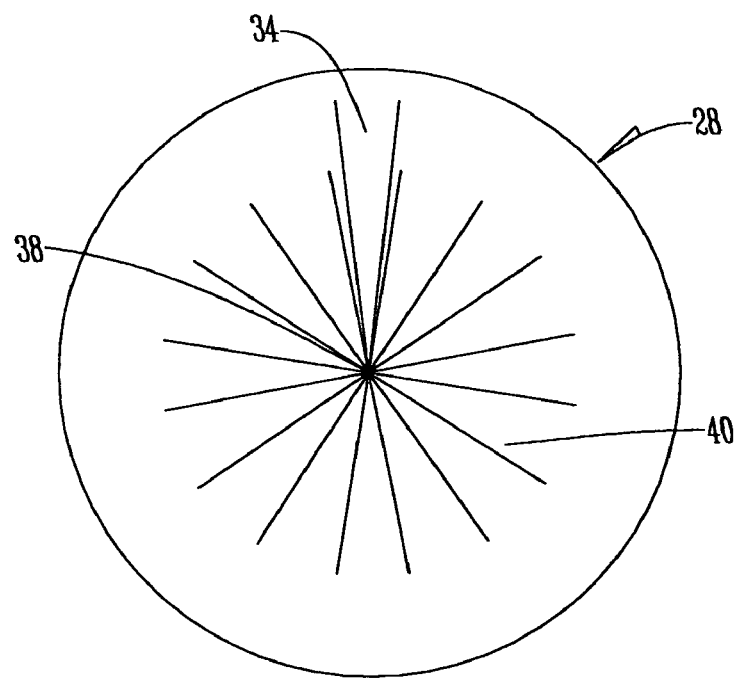
FIG. 3 is a plan view of another embodiment of the present invention.

In an alternative embodiment, as shown in FIG. 3, the escutcheon 28 is generally circular in shape with a center 38. Prongs 40 extend radially from the center 38 and bend back when the escutcheon 28 is inserted on the inlet tube 12. In this manner, the flexible prongs 40 grasp the inlet tube 12 to secure the escutcheon 28 against the interior surface 18 of the wall 14.

In operation, the hydrant 10 is positioned such that the flange 22 is against the exterior surface 16 of the wall 14 and the inlet tube 12 extends through the wall 14. The escutcheon 28, which is received by the inlet tube 12, is placed against the interior surface 18 of the wall 14. As the escutcheon 28 is inserted over the inlet tube 12, the flexible prongs 32 and 40 bend back and grasp the inlet tube 12. In this arrangement, the prongs 32 and 40 hold the escutcheon 28 firmly against the interior surface 18 of the wall 14, thereby holding the flange 22 of the hydrant 10 firmly against the exterior surface 16 of the wall 14.

Tear-away portion 34 allows for easy removal of the escutcheon 28. Specifically, exerting force on the tab 36 causes the tear-away portion 34 to sever, thereby tearing the escutcheon 28 away from the inlet tube 12.

It is therefore seen that by the use of an escutcheon with flexible prongs, this invention permits a wall hydrant to be secured to a wall without the need for additional hardware.

What is claimed is:

1. A wall hydrant having an inlet tube extending through a wall having an exterior and interior surface comprising:
   an escutcheon received by the inlet tube for placement against the interior surface of the wall with flexible prongs that extend radially from a center for securing the hydrant against the exterior surface of the wall.

2. The device of claim 1 wherein the escutcheon has a tear-away portion.

3. The device of claim 2 wherein the tear-away portion has a pull tab.

4. A wall hydrant having an inlet tube extending through a wall having an exterior and interior surface comprising:
   an escutcheon received by the inlet tube for placement against the interior surface of the wall with flexible prongs that extend radially from a center aperture for securing the hydrant against the exterior surface of the wall.

5. The device of claim 4 wherein the escutcheon has a tear-away portion.

6. The device of claim 5 wherein the tear-away portion has a pull tab.

7. A wall hydrant assembly comprising:
a wall hydrant fluidly connected to an inlet tube extending through a wall having an exterior and interior surface, and
a flexible escutcheon received by the inlet tube for placement against the interior surface of the wall.

8. The device of claim 7 wherein prongs extend radially from a center aperture of the escutcheon for securing the hydrant against the exterior surface of the wall.

9. The device of claim 7 wherein the escutcheon has a tear-away portion.

10. The device of claim 9 wherein the tear-away portion has a pull tab.

11. The device of claim 1 wherein the flexible prongs contact the interior surface of the wall.

12. The device of claim 4 wherein the flexible prongs contact the interior surface of the wall.

13. The device of claim 7 wherein flexible prongs extend radially from a center of the escutcheon and contact the interior surface of the wall for securing the hydrant against the exterior surface of the wall.

* * * * *